US006600976B1

United States Patent
Goodzeit et al.

(10) Patent No.: US 6,600,976 B1
(45) Date of Patent: Jul. 29, 2003

(54) GYROLESS CONTROL SYSTEM FOR ZERO-MOMENTUM THREE-AXIS STABILIZED SPACECRAFT

(75) Inventors: Neil Evan Goodzeit, Princeton, NJ (US); Xipu Li, San Jose, CA (US); Santosh Ratan, Highland Park, NJ (US); Harald Weigl, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 197 days.

(21) Appl. No.: 10/108,626

(22) Filed: Mar. 29, 2002

(51) Int. Cl.[7] .................................. B64G 1/24
(52) U.S. Cl. .............................. 701/13; 244/164
(58) Field of Search .................. 701/13, 4, 226; 244/164, 165, 169, 170, 171

(56) References Cited

U.S. PATENT DOCUMENTS

| 3,813,067 A | * | 5/1974 | Mork | 244/165 |
| 5,058,835 A | * | 10/1991 | Goodzeit et al. | 244/165 |
| 5,123,617 A | * | 6/1992 | Linder et al. | 244/166 |
| 6,285,928 B1 | * | 9/2001 | Tilley et al. | 701/13 |
| 6,292,722 B1 | * | 9/2001 | Holmes et al. | 701/13 |
| 6,314,344 B1 | * | 11/2001 | Sauer et al. | 701/13 |
| 6,327,523 B2 | * | 12/2001 | Cellier | 701/13 |
| 6,336,062 B1 | * | 1/2002 | Yamashita | 701/13 |

FOREIGN PATENT DOCUMENTS

EP        000604214   *  6/1994  ............... 701/13

* cited by examiner

Primary Examiner—Richard M. Camby
(74) Attorney, Agent, or Firm—Swidler Berlin Shereff Friedman, LLP

(57) ABSTRACT

A method for maintaining three axis control of a geosynchronous spacecraft without body rate measurements using reaction wheel assemblies. Earth sensor assembly angle measurements are utilized for high-bandwidth roll and pitch control. A positive pitch momentum bias is stored in the reaction wheel assemblies. A gyroscopic feedforward torque is applied to rotate reaction wheel assembly momentum in a yaw/roll plane of the spacecraft at orbit rate. A dynamic mode that couples yaw and roll axes and that results from applying the gyroscopic feedforward torque and the high-bandwidth roll control is damped based on earth sensor assembly roll measurements.

26 Claims, 2 Drawing Sheets

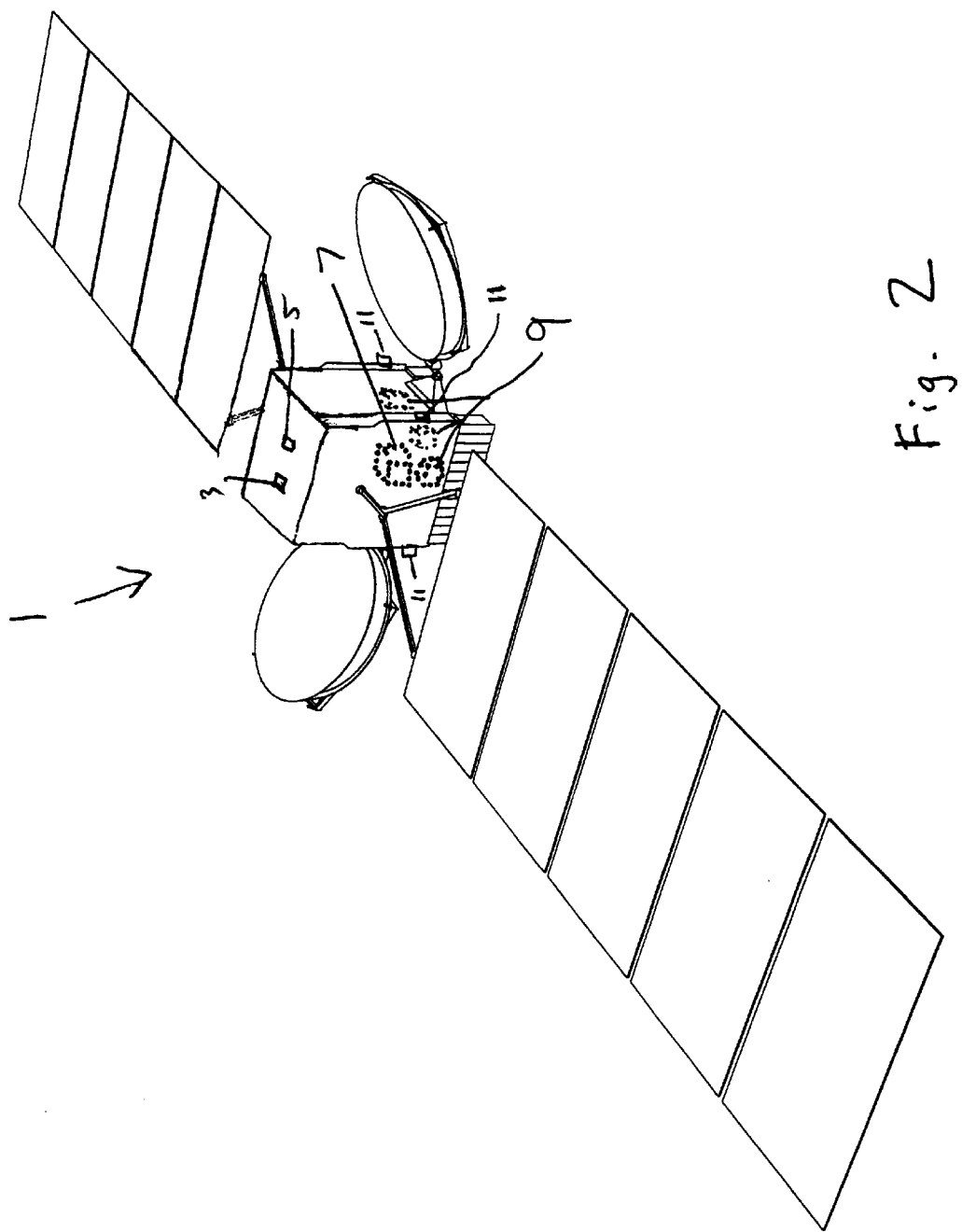

GYROLESS CONTROL SYSTEM FOR ZERO-MOMENTUM THREE-AXIS STABILIZED SPACECRAFT

FIELD OF THE INVENTION

The present invention relates to a method and system for attitude control of a spacecraft utilized when an inertial measurement unit is either permanently inoperable, temporarily unavailable, or otherwise not present.

BACKGROUND OF THE INVENTION

Zero-momentum stabilized spacecraft typically include at least one inertial measurement unit (IMU) to measure angular rates of the spacecraft. The inertial measurement unit includes a plurality of gyroscopes to measure spacecraft angular rates about each of three axes. A processor internal to the IMU controls its operation and a power supply provides power to the IMU and its components.

Measurements from the IMU are utilized to maintain the spacecraft pointing in a desired direction to permit the spacecraft to carry out its mission and to permit control of the spacecraft. In the case of an earth orbiting communications satellite, the IMU is utilized to maintain one face of the satellite pointed toward the earth. Failure of the IMU can result in mispointing of a spacecraft and its antennas, disrupting the spacecraft mission.

Known zero momentum control systems utilize the IMU to continuously measure rate for attitude determination and control. The angular rate information is used to continuously propagate the three-axis inertial attitude. Attitude sensor(s), such as earth and sun sensors, are employed to measure the spacecraft attitude and correct for errors in propagated attitude and estimate the gyro biases.

An earth sensor assembly (ESA) is used to measure roll and pitch attitude, while a sun sensor assembly (SSA) measures yaw attitude. The estimated attitude and rate are compared to a commanded attitude and rate, to generate control error signals. Resulting error signals are input to a proportional-integral-derivative (PID) controller that computes corrective control torque demands.

In the PID controller processing, the attitude error is multiplied by a proportional gain, the rate (derivative) error is multiplied by a derivative gain, and the attitude error is integrated and multiplied by an integral gain. For less precise pointing, a proportional-derivative (PD) controller may be used, where the integral term is deleted. The control torque demands generated by the PID controller for each of the spacecraft yaw, roll, and pitch axes are input to control logic that distributes the demands to actuators such as reaction wheels or thrusters to generate control torques. The control torques applied by the actuators reduce the attitude and rate errors, to maintain alignment between the spacecraft body coordinate frame and an earth-pointing coordinate frame.

The availability of continuous three-axis angular rate information from an IMU facilitates a zero-momentum control approach in which high-bandwidth attitude control loops may be closed on each of the yaw, roll, and pitch axes. Such high-bandwidth control loops are characterized by open-loop crossover frequencies between about 0.08 and about 0.2 rad/sec, transient response settling times of approximately 2 to 3 minutes, and good rejection of environmental and thruster-firing disturbance torques.

Known gyroless control systems use an earth sensor to measure roll and pitch, and a stored angular momentum along the pitch axis for indirect yaw control. The pitch momentum is typically stored in a momentum wheel assembly that is operated at near constant speed, with small commanded speed variations for pitch control. Roll and yaw control may be provided using magnetic torquers or thrusters.

For known systems, the bandwidth of the roll control is typically low, about an order of magnitude lower than the bandwidth of the zero-momentum roll control loop. The bandwidth of the roll control is constrained by the frequency of the spacecraft nutation mode. The frequency of this dynamics mode, that couples the roll and yaw axes, is determined by the bias pitch momentum and the spacecraft roll and yaw moments of inertia, according to the formula $$\lambda = h/\sqrt{I_x I_y}$$

where h is the pitch momentum bias, $I_x$ is the yaw momentum of inertia, and $I_y$ is the roll moment of inertia. For a spacecraft using a prior-art gyroless system, h=500 in-lb-sec, $I_x = I_y = 100{,}000$ in-lb-sec$^2$, and the nutation frequency is 0.005 rad/sec. The disadvantage of the low-bandwidth roll control is that about 20 to 30 minutes is required for the transient response to settle. Also, reduced disturbance rejection due to the lower bandwidth results in increased pointing errors due to environmental disturbance and thruster-firing torques.

Furthermore, the structure of the prior-art gyroless system is highly dissimilar to zero-momentum systems. First, these prior-art systems do not use reaction wheels for control. This is because these systems must apply external torques to control yaw, and reaction wheels can only apply internal torques. External roll and yaw torques, applied using magnetic torquers or thrusters, are used to control yaw by correcting the pointing of the spacecraft angular momentum vector in response to the sensed roll attitude error. The control system keeps the spacecraft momentum vector, nominally aligned with the spacecraft pitch axis, aligned with the orbit normal.

Second, as described herein, the roll control is implemented by applying primarily yaw control torque in response to the sensed roll error, and simultaneously applying yaw and roll torques to damp the nutation mode. This is in contrast to the zero-momentum roll control, which applies roll control torques in response to the sensed roll error. Furthermore, zero-momentum systems do not include nutation damping controllers, since the nutation mode, which may or may not exist depending on the momentum stored in the reaction wheels, is essentially eliminated by the closure of high bandwidth roll and yaw control loops.

SUMMARY OF THE INVENTION

The present invention provides a method and system for maintaining spacecraft pointing performance in the event of IMU failure. The present invention addresses the limitations of known gyroless spacecraft attitude control systems. In particular, the present invention provides a method for gyroless control that uses reaction wheels and retains a high degree of similarity to standard zero-momentum systems. Specifically, the gyroless roll control may use a standard PD controller that provides the same loop bandwidth as is typical of zero-momentum systems. Furthermore, the gyroless system may use the same reaction wheel torque distribution logic as a standard zero-momentum system. The modifications needed to provide gyroless yaw control may include simple add-ons to a zero-momentum system, and may be implemented with minimal changes to the flight software that operates in the spacecraft on-board processor. Because of its close similarity to zero-momentum control systems, a gyroless system according to the invention is well suited for incorporation in a hybrid system that can either operate in a gyro-based or gyroless mode. Such a system is described in patent application TBS, where the gyroless mode is automatically invoked to maintain payload pointing in the event of a failure of the inertial measurement unit.

Along these lines, the present invention provides a method for maintaining three-axis control of a geosynchronous spacecraft without body angular rate measurements and using reaction wheel assemblies. The method utilizes earth sensor assembly angle measurements for high-bandwidth roll and pitch control. A positive pitch momentum bias is stored in the reaction wheel assemblies. A gyroscopic feedforward torque is applied to rotate the reaction wheel assembly momentum in a yaw/roll plane of the spacecraft at orbit rate. A dynamic mode is damped based on earth sensor assembly roll measurements. The dynamic mode couples the yaw and roll axes and results from the pitch bias momentum, applying the gyroscopic feedforward torque, and the high-bandwidth roll control.

The present invention also provides a method for gyroless control of a spacecraft. A reaction wheel assembly momentum on each axis of the spacecraft and earth sensor assembly roll and pitch angles are input to a controller. Earth sensor assembly angles and roll and pitch reaction wheel assembly momentum are processed through high bandwidth controllers for roll and pitch control. Earth sensor assembly roll angle and reaction wheel assembly roll and yaw momentum are processed for yaw control. Reaction wheel assembly torque demands are determined and an output generated with the controller to effect the reaction wheel assembly torque demands. Reaction wheel assemblies are actuated to effect the torque demands.

Additionally, the present invention provides a system for gyroless control of a spacecraft. The system includes high-bandwidth control loops operable to utilize earth sensor assembly angle measurements for roll and pitch control. The system also includes reaction wheel assemblies operable to store a positive pitch momentum bias and to receive a gyroscopic feedforward torque to rotate reaction wheel assembly momentum in a yaw/roll plane of the spacecraft at orbit rate. Additionally, the system includes a controller operable, based on earth sensor assembly roll measurements, to damp a dynamic mode that couples yaw and roll axes and that results from applying pitch momentum bias, the gyroscopic feedforward torque, and the high-bandwidth roll control.

Furthermore, the present invention provides a system for gyroless control of a spacecraft attitude. The system includes a controller operable to receive a reaction wheel assembly momentum on each axis of the spacecraft and earth sensor assembly roll and pitch angles. The controller determines reaction wheel assembly torque demands and generates output to effect the reaction wheel assembly torque demands and processes earth sensor assembly roll angle and reaction wheel assembly roll and yaw momentum for yaw control. A plurality of high bandwidth controllers are operable to process earth sensor assembly angles and roll and pitch reaction wheel assembly momentum for roll and pitch control.

Still further, the present invention provides a spacecraft that includes a plurality of reaction wheel assemblies, an earth sensor assembly, and a controller operable to carry out any of the methods described herein.

Still other objects and advantages of the present invention will become readily apparent by those skilled in the art from a review of the following detailed description. The detailed description shows and describes preferred embodiments of the present invention, simply by way of illustration of the best mode contemplated of carrying out the invention. As will be realized, the present invention is capable of other and different embodiments and its several details are capable of modifications in various obvious respects, without departing from the present invention. Accordingly, the drawings and description are illustrative in nature and not restrictive.

BRIEF DESCRIPTION OF THE DRAWINGS

Objects and advantages of the present invention will be more clearly understood from the following specification when considered in conjunction with the accompanying drawings, in which:

FIG. 2 represents an embodiment of a spacecraft according to the present invention.

DETAILED DESCRIPTION OF THE INVENTION

Figure 1:
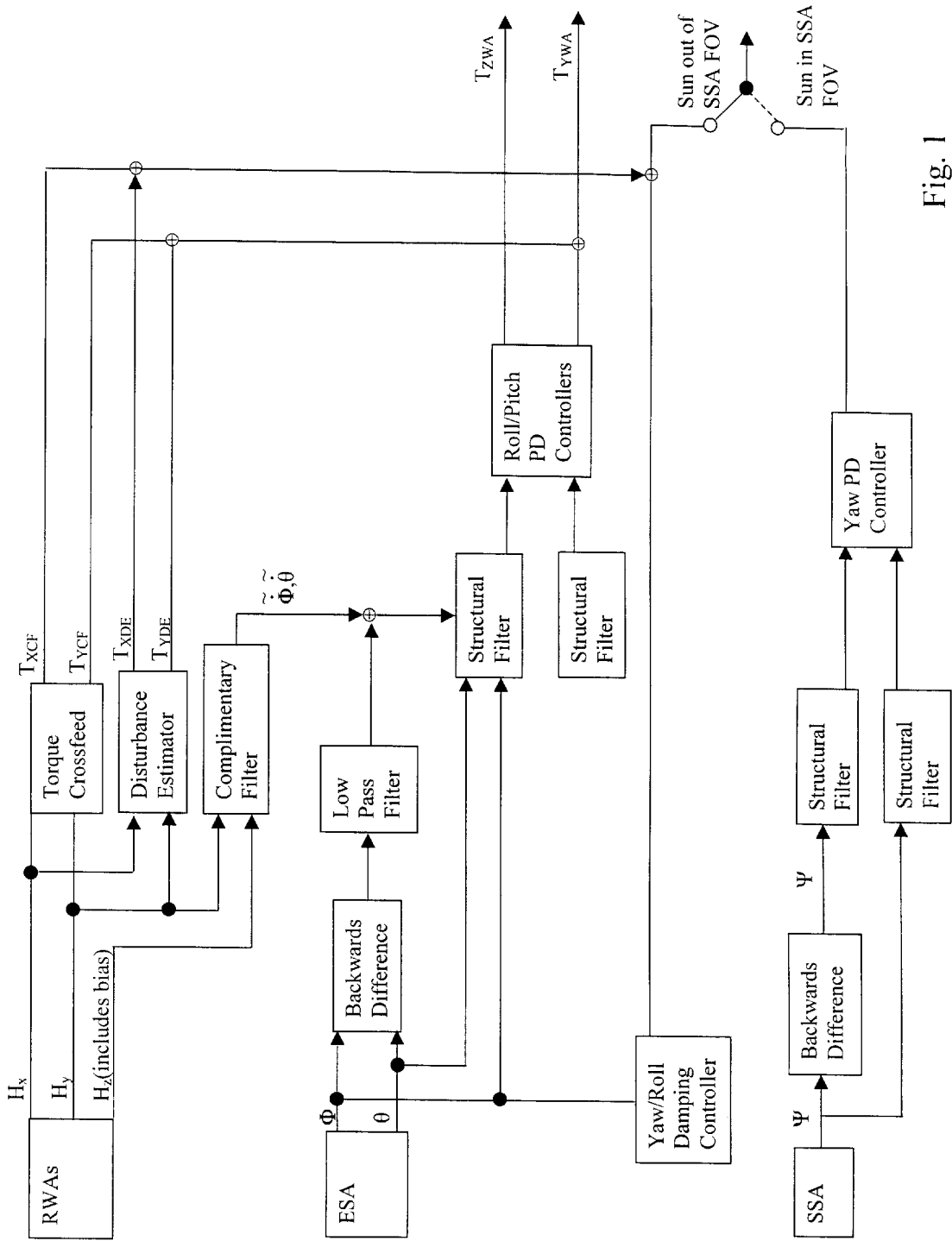
FIG. 1 represents a diagram that illustrates an embodiment of a system according to the present invention.

The system includes a gyroless attitude control system operable to control spacecraft attitude without receiving data from the inertial measurement unit. By maintaining payload pointing performance when IMU data is invalid, the present invention provides time to reconfigure hardware to correct any failures, while the spacecraft mission continues without interruption. The present invention can permit seamless transition from gyro based control to gyroless control, and seamless return from gyroless control to gyro based control after an IMU failure clears.

Unlike known momentum bias control systems, the present invention can maintain high bandwidth roll control and can move the low-frequency nutation mode present in known systems to a higher frequency yaw/roll coupling mode. Also, utilizing the present invention, diurnal disturbance estimation may be independent of mass properties and the pitch momentum bias.

The method and system of the present invention includes a hybrid zero-momentum/momentum bias/disturbance rejection control system with reaction wheel assembly actuation. This system may use the nominal gyro-based zero-momentum hardware and control structure with several modifications. The gyroless controller inputs are RWA momentum on the yaw, roll, and pitch axes, ESA roll and pitch angles, and, when available, SSA sun elevation angle. The controller outputs are the yaw, roll, and pitch RWA torque demands.

High bandwidth proportional-derivative (PD) control loops may be closed on the pitch and roll axis, using ESA angles and derived rates. According to one embodiment of the present invention, the formula for the PD controller for the pitch axis is given by $$T_{PD} = K_p \theta + K_d \dot{\theta}$$

where $T_{PD}$ is the control torque demand, $K_p$ is the gain multiplying the pitch error $\theta$ and $K_d$ is the gain multiplying the pitch rate error $\dot{\theta}$. An identical expression may be used for roll control. To achieve high-bandwidth control, the gains may be selected to provide an open-loop crossover frequency of between about 0.08 to about 0.2 rad/sec. Because the present invention is utilized when IMU data is not available, the low frequency roll and pitch rates may be estimated by differencing the ESA angles. According to one embodiment, the differencing is carried out using the following expression $$\dot{\theta}_{ESA}(k) = \frac{\theta_{ESA}(k) - \theta_{ESA}(k-1)}{\Delta t}$$

where $\theta_{ESA}(k)$ is the earth sensor measurement at the $k_{th}$ time step, and $\Delta t$ is the sampling time interval.

The PD controller may also use a psuedo rate calculated using the measured roll and pitch RWA momentum and the differenced ESA angles. The pseudo rate can provide ESA noise attenuation while maintaining the required stability margins for the high-bandwidth roll and pitch control. The total pitch rate estimate that includes a low-frequency portion based on the difference of the ESA pitch angles, and a high frequency portion based on pitch RWA momentum is given by $$\dot{\theta} = G_{SF}(z)\left[\dot{\theta}_{ESA}F(z) - \frac{H_{RWA}(z)}{I_z}[1 - F(z)]\right]$$

where $H_{RWA}(z)$ the pitch axis reaction wheel assembly momentum, $I_z$ is the pitch axis moment of inertia, F(z) is the transfer function for a low-pass filter, 1−F(z) is transfer function for a complementary high-pass filter, and $G_{SF}(z)$ is the transfer function for a low-pass structural filer. A similar expression may be used to calculate the estimated rate on the roll axis. The low-pass filter F(z) is implemented as the discrete-time equivalent of a $2^{nd}$ order continuous-time filter with a transfer function $$F(s) = \frac{\omega_d^2(ks^2 + 2\rho_n\omega_n s + \omega_n^2)}{\omega_n^2(s^2 + 2\rho_d\omega_d s + \omega_d^2)}$$

where representative filter parameters are given in Table 1. At frequencies below about 0.1 rad/sec, the magnitude of the second order low-pass filter in Table 1 is 1.0 and the phase angle is 0 degrees. The filter magnitude begins to roll off at roughly 0.1 rad/sec with a slope of −40 dB/decade above 1.0 rad/sec.

TABLE 1

Representative Low-Pass Filter Parameters

| | |
|---|---|
| K | 0.0 |
| $\rho_d$ | 0.0 |
| $\omega_n$ | 1.0 |
| $\rho_d$ | 1.0 |
| $\omega_d$ | 0.4 |

The structural filter $G_{SF}(z)$ may provide low-pass filtering to attenuate the contributions to the estimated rate from the spacecraft structural dynamics, to maintain adequate stability margins as is well understood in the prior-art. A typical structural filter, used to provide filtering of both the rate and attitude error in the present invention, is given by the discrete-time equivalent of the low-pass filter F(s) given above. In practice, several of these $2^{nd}$ order filters may be cascaded, i.e., combined in series, to provide greater high-frequency attenuation. Typically, for structural filtering, the filter parameters are selected so that filter gain is unity and phase lag is minimal at frequencies near and below the open loop cross-over frequency indicated above.

Unlike the roll and pitch attitude, which may be continuously measured by the ESA, yaw attitude measurements typically are only available when the Sun is within the Sun sensor assembly (SSA) field of view (FOV). During this time, the gyroless attitude control system may provide high-bandwidth PD yaw control using the SSA measurements. The yaw body rate may be estimated by differencing the SSA yaw measurements in the same way as discussed previously in connection with the ESA measurements. The gyroless attitude control system continues to maintain yaw pointing performance when SSA measurements are unavailable. In this case, the yaw attitude may be controlled using the coupling between the yaw and roll axes introduced by a positive pitch momentum bias as described below.

To control yaw when the sun is not in the SSA field of view, the standard PD yaw controller may be disabled while three new control loops are closed. The first two closed control loops may include gyroscopic torque canceling crossfeeds from roll RWA momentum to yaw RWA torque, and from yaw RWA momentum to roll RWA torque. According to one embodiment of the present invention, the crossfeed torques on the yaw(x) and roll(y) axes are determined according to the following equations $$T_{CROSS}(x) = \Omega_{orbit}H_{RWA}(y), T_{CROSS}(y) = -\Omega_{orbit}H_{RWA}(x)$$

where $\Omega_{orbit}$ is the geosynchronous orbit rate, and $H_{RWA}(y)$ is the measured roll reaction wheel assembly momentum and $H_{RWA}(x)$ is the measured yaw reaction wheel assembly momentum. The measured reaction wheel momentum is determined from the measured reaction wheel speeds and the reaction wheel spin axis orientations in the spacecraft body frame. The torque crossfeeds circulate the momentum in the yaw/roll plane at orbit rate, in the same way that the momentum would naturally circulate if both high-bandwidth yaw and roll control loops were simultaneously closed. The presence of RWA momentum along the pitch axis, the torque crossfeeds, and the high-bandwidth PD roll control typically results in a high-frequency yaw/roll coupling mode that is at least marginally stable.

A third loop closure from ESA roll angle to RWA yaw torque may be used to damp this yaw/roll coupling mode. A typical damping controller according to the invention may be implemented as the discrete time version of the continuous-time transfer function $$G_{damp}(s) = \frac{K_{damp}s\omega_{damp}^2}{s^2 + 2\rho_{damp}\omega_{damp}s + \omega_{damp}^2}$$

where representative damping controller parameters are given in Table 2. The frequency of the second-order system may be chosen to match to the frequency of the yaw/roll coupling mode in the middle of the expected operating range of pitch momentum. The frequency response of the damping controller corresponds to a band-pass filter with the maximum gain and zero phase at the frequency of the yaw/roll coupling mode.

TABLE 2

Representative Damping Controller Parameters

| | |
|---|---|
| $K_{damp}$ | 150000.0 |
| $\rho_{damp}$ | 0.9 |
| $\omega_{damp}$ | 0.0004 |

To facilitate the switch to gyroless yaw control, a small positive pitch momentum from 80 to 200 in-lb-sec may be maintained in the RWAs at all times. This pitch momentum is typically accommodated with no less than one-week between RWA momentum adjust maneuvers.

One major source of yaw disturbances that affects performance without SSA yaw control is the inertial environmental disturbance torque resulting from solar pressure on the solar arrays. This inertial disturbance torque results in an increasing reaction wheel momentum in the spacecraft body frame. The inertial disturbance effect on yaw pointing may be counteracted by applying equal and opposite diurnally varying yaw and roll torques to the spacecraft body using the reaction wheels.

A disturbance torque estimator may be incorporated into the gyroless control architecture to compute the constant and diurnal yaw and roll disturbance torques from the measured yaw and roll RWA momentum. The formulation of the disturbance estimator may be independent of the spacecraft mass properties and the pitch momentum bias. The estimated diurnal torques may be applied to the yaw and roll axes to cancel the actual disturbances.

The state equations upon which the estimator is based describe the dynamic relationship between the applied disturbance torques and the reaction wheel assembly momentum, assuming that the spacecraft attitude is controlled to the earth-pointing coordinate frame. According to one embodiment of the present invention, the state equations are given by $$\dot{x}=Ax,\ y=Cx$$

where the state vector x, the output vector y, and the matrices A and C are $$x = [H_x\ H_y\ T_x\ T_y\ \bar{T}_x\ (\bar{T}_y)]^T$$

$$A = \begin{bmatrix} 0 & \Omega_{orbit} & 1 & 0 & 1 & 0 \\ -\Omega_{orbit} & 0 & 0 & 1 & 0 & 1 \\ 0 & 0 & 0 & \Omega_{orbit} & 0 & 0 \\ 0 & 0 & -\Omega_{orbit} & 0 & 0 & 0 \\ 0 & 0 & 0 & 0 & 0 & 0 \\ 0 & 0 & 0 & 0 & 0 & 0 \end{bmatrix},$$

$$C = \begin{bmatrix} 1 & 0 & 0 & 0 & 0 & 0 \\ 0 & 1 & 0 & 0 & 0 & 0 \end{bmatrix}$$

where $H_x$ and $H_y$ are the yaw and roll RWA momentum, $T_x$ and $T_y$ are the yaw and roll diurnal components of the disturbance torque, and $\bar{T}_x$ and $\bar{T}_y$ are the yaw and roll body fixed components of the disturbance torque.

The diurnal torque components vary sinusoidally in the spacecraft body frame, with yaw and roll components 90 degrees out of phase. To an observer fixed in the spacecraft, the total yaw/roll disturbance appears to rotate about the pitch axis in the clockwise direction. Based on these state equations, a discrete-time estimator may be designed using techniques known to those skilled in the art without undo experimentation. The estimator produces estimates of $T_x$ and $T_y$, which are applied to the reaction wheel assemblies to cancel the actual diurnal disturbance torque and hence improve yaw pointing performance.

The system according to the present invention can maintain precision three-axis attitude control while valid angular rate data is unavailable. The controller inputs may include RWA momentum on each axis and ESA roll and pitch angles. The input may also include SSA elevation angle data when it is available for several hours per orbit. The controller outputs may include RWA torque demands.

High bandwidth proportional-derivative (PD) control loops may be closed on the pitch and roll axes, using ESA angles and derived rates. These loops may use measured roll and pitch RWA momentum to derive a high-frequency pseudo rate that is used for ESA noise attenuation while maintaining the required stability margins for the high-bandwidth roll and pitch control.

The control structure in roll and pitch may be similar to a standard zero-momentum control approach. Yaw control may be accomplished indirectly using a small positive pitch momentum stored in the reaction wheels. The positive pitch momentum may be on the order of about 80 to about 200 in-lb-sec. More typically the positive pitch momentum is about 100 to about 200 in-lb-sec. This momentum may be maintained at all times during gyro-based operations, so it is available in the event that the gyroless control system must be activated.

To control yaw, the standard PID controller may be disabled while three loops are closed. The first two closed control loops may be gyroscopic torque canceling crossfeeds from roll RWA momentum to yaw RWA torque, and from yaw RWA momentum to roll RWA torque. A third loop closure from ESA roll angle to RWA yaw torque may be used to damp a yaw/roll coupling mode that arises from the gyroscopic crossfeeds and the roll PD control.

The performance of the gyroless system may be further enhanced by applying estimates of the inertial component of the yaw and roll environmental disturbance torques to the RWAs. These disturbance torques may be output by an estimator that may operate utilizing the RWA momentum data. Additionally, when sun sensor data is available, a yaw PD loop may be closed using yaw angle and rate derived from the SSA elevation angle data. Also, during gyroless operation, the spacecraft inertial-to-body quaternion may be preserved by propagating it using the known angular rate of the orbit frame relative to the inertial frame based on the spacecraft ephemeris model.

FIG. 2 illustrates an embodiment of a spacecraft according to the present invention. The spacecraft 1 shown in FIG. 2 includes an earth sensor 3, sun sensor 5, IMU 7, reaction wheels 9, and thrusters 11.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method for maintaining three axis control of a geosynchronous spacecraft without body angular rate measurements using reaction wheel assemblies, the method comprising:

utilizing earth sensor assembly angle measurements for high-bandwidth roll and pitch control;

storing a positive pitch momentum bias in the reaction wheel assemblies;

applying a gyroscopic feedforward torque to rotate reaction wheel assembly momentum in a yaw/roll plane of the spacecraft at orbit rate; and damping based on earth sensor assembly roll measurements a dynamic mode that couples yaw and roll axes and that results from the pitch bias momentum, applying the gyroscopic feedforward torque and the high-bandwidth roll control.

2. The method according to claim 1, whereby the roll and pitch control uses roll and pitch rates estimated based on differenced earth sensor assembly angles at low frequency and reaction wheel assembly body momentum at high frequency.

3. The method according to claim 1, further comprising:
improving yaw control of the spacecraft using estimates of a disturbance torque acting on the spacecraft, wherein the disturbance torque is estimated based on reaction wheel assembly momentum.

4. The method according to claim 1, further comprising:
utilizing high bandwidth yaw control based on sun sensor assembly measurements when the sun is in a sun sensor assembly field of view.

5. The method according to claim 1, further comprising:
preserving a spacecraft-to-body quaternion by propagating the quaternion using a known angular rate of an orbit frame relative to an inertial frame based on a spacecraft ephemeris model.

6. The method according to claim 1, further comprising:
deriving a high frequency pseudo rate from measured roll and pitch reaction wheel assembly momentum; and
utilizing the pseudo rate to attenuate earth sensor assembly noise to maintain high bandwidth roll and pitch control.

7. The method according to claim 1, further comprising:
maintaining a positive pitch momentum bias of about 80 to about 200 in-lb-sec.

8. The method according to claim 1, further comprising:
estimating diurnal yaw and roll disturbance torques from a measured yaw and roll reaction wheel assembly momentum; and
canceling diurnal disturbance torques by applying the estimated diurnal torques to yaw and roll axes of the spacecraft.

9. A method for gyroless control of a spacecraft, the method comprising:
inputting to a controller a reaction wheel assembly momentum on each axis of the spacecraft and earth sensor assembly roll and pitch angles;
processing earth sensor assembly angles and roll and pitch reaction wheel assembly momentum through high bandwidth controllers for roll and pitch control;
processing earth sensor assembly angle and reaction wheel assembly roll and yaw momentum for yaw control;
determining reaction wheel assembly torque demands and generating output with the controller to effect the reaction wheel assembly torque demands; and
actuating reaction wheel assemblies to effect the torque demands.

10. The method according to claim 9, wherein at least a portion of the closed control loops are closed on the pitch and roll axis utilizing earth sensor assembly angles and derived rates.

11. The method according to claim 9, further comprising:
estimating low frequency roll and pitch rates for roll and pitch control by differencing measured earth sensor assembly angles.

12. The method according to claim 9, further comprising:
deriving a high frequency pseudo rate from measured roll and pitch reaction wheel assembly momentum; and
utilizing the pseudo rate to attenuate earth sensor assembly noise for high bandwidth roll and pitch control.

13. The method according to claim 9, wherein the yaw control comprises:
closing a control loop of gyroscopic torque canceling crossfeeds from roll reaction wheel assembly momentum to yaw reaction wheel assembly torque and from yaw reaction wheel assembly momentum to roll reaction wheel assembly torque; and
damping a yaw/roll coupling mode arising from the gyroscopic crossfeeds and the roll control.

14. The method according to claim 9, further comprising:
maintaining a positive pitch momentum of about 80 to about 200 in-lb-sec in reaction wheel assemblies of the spacecraft.

15. The method according to claim 9, further comprising:
estimating diurnal yaw and roll disturbance torques from a measured yaw and roll reaction wheel assembly momentum; and
canceling diurnal disturbance torques by applying the estimated diurnal torques to yaw and roll axes of the spacecraft.

16. The method according to claim 9, further comprising:
generating estimates of inertial components of yaw and roll environmental disturbance torques utilizing roll and yaw reaction wheel assembly speed data; and
applying the estimates to the reaction wheel assemblies.

17. The method according to claim 9, further comprising:
closing a yaw proportional derivative control loop using yaw angle and rate derived from sun sensor assembly elevation angle data when the sun is in the sun sensor assembly field of view.

18. The method according to claim 9, further comprising:
preserving a spacecraft-to-body quaternion by propagating the quaternion using a known angular rate of an orbit frame relative to an inertial frame based on a spacecraft ephemeris model.

19. A system for gyroless control of a spacecraft, the system comprising:
high-bandwidth control loops operable to utilize earth sensor assembly angle measurements for roll and pitch control;
reaction wheel assemblies operable to store a positive pitch momentum bias and to receive a gyroscopic feedforward torque to rotate reaction wheel assembly momentum in a yaw/roll plane of the spacecraft at orbit rate; and
a controller operable based on earth sensor assembly roll measurements to damp a dynamic mode that couples yaw and roll axes and that results from applying the pitch momentum bias, the gyroscopic feedforward torque and the high-bandwidth roll control.

20. The system according to claim 19, further comprising:
an estimator operable to estimate an inertial component of yaw and roll environmental disturbance torques using reaction wheel assembly speed data.

21. The system according to claim 19, wherein the system is operable to control spacecraft attitude utilizing data received from the earth sensor, the sun sensor and reaction wheel assembly speed information.

22. The system according to claim 19, wherein the system is operable to produce reaction wheel assembly torque demands.

23. The system according to claim 19, wherein the system is operable to preserve a spacecraft inertial-to-body quaternion by propagating the quaternion using a known angular rate of an orbit frame relative to an inertial frame based on a spacecraft ephemeris model.

24. A system for gyroless control of a spacecraft attitude, the system comprising:
   a controller operable to receive a reaction wheel assembly momentum on each axis of the spacecraft and earth sensor assembly roll and pitch angles, wherein the controller determines reaction wheel assembly torque demands and generates output to effect the reaction wheel assembly torque demands and processes earth sensor assembly roll angle and reaction wheel assembly roll and yaw momentum for yaw control; and
   a plurality high bandwidth controllers operable to process earth sensor assembly angles and roll and pitch reaction wheel assembly momentum for roll and pitch control.

25. The system according to claim 24, further comprising:
   an estimator operable to estimate diurnal yaw and roll disturbance torques from a measured yaw and roll reaction wheel assembly momentum and canceling diurnal disturbance torques by applying the estimated diurnal torques to yaw and roll axes of the spacecraft.

26. A spacecraft, comprising:
   a plurality of reaction wheel assemblies;
   an earth sensor assembly;
   a controller operable to maintain three axis control of a geosynchronous spacecraft without body rate measurements using the reaction wheel assemblies, the controller utilizing earth sensor assembly angle measurements for high-bandwidth roll and pitch control, causing the reaction wheel assemblies to store a positive pitch momentum bias, causing a gyroscopic feedforward torque to be applied to rotate reaction wheel assembly momentum in a yaw/roll plane of the spacecraft at orbit rate, and damping based on earth sensor assembly roll measurements a dynamic mode that couples yaw and roll axes and that results from applying the gyroscopic feedforward torque and the high-bandwidth roll control.

* * * * *